Jan 6, 1931.  O. E. LUCHT  1,787,829
COOKY HOLDER
Filed May 12, 1930
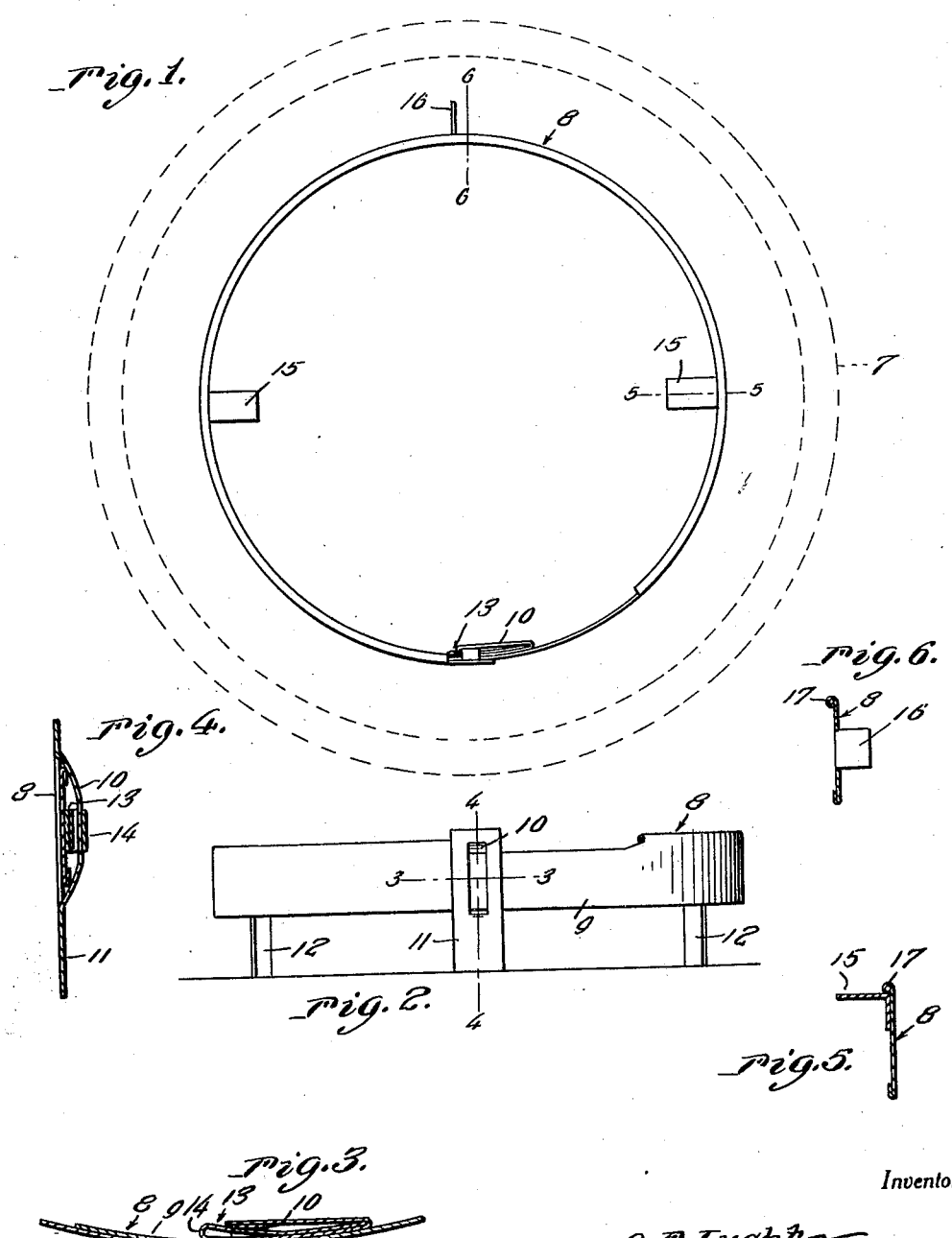
Inventor
O. E. Lucht
By Clarence A. O'Brien
Attorney Patented Jan. 6, 1931

1,787,829

UNITED STATES PATENT OFFICE

OTTO E. LUCHT, OF MILWAUKEE, WISCONSIN

COOKY HOLDER

Application filed May 12, 1930. Serial No. 451,833.

This invention relates to an improved food pan insert in the nature of a holder or rack for supporting a plurality of cookies, cakes or the like in position for making what is frequently referred to in the trade as an ice box torten.

Briefly stated, the device is in the nature of an adjustable leg-supported annulus or ring which is placed concentrically in the pan in such a way as to permit the cookies to be racked between the rim of the pan and the ring-like holder, and to permit a predetermined quantity of batter to be poured in the pan so as to hold the cookies imbedded therein in the marginal portion and to permit subsequent removal of the holder so as to permit the remainder of the pan to be filled with the batter.

The novelty is predicated upon the specific structural arrangement of details utilized in the construction of the holder whereby to facilitate adjustment and placement as well as removal of the holder and to insure convenient and dependable racking of the cookies for aiding in the preparation of the novel dessert or delicacy.

In the drawings:

Figure 1 is a plan view showing the holder in the pan, the pan being shown in dotted lines.

Figure 2 is a side elevational view of the separable end portion of the ring, showing the elevated legs attached thereto.

Figures 3 and 4 are sectional views taken on the planes of the lines 3—3 and 4—4 respectively of Figure 2.

Figure 5 is a section on the line 5—5 of Figure 1.

Figure 6 is a section on the line 6—6 of Figure 1.

In the drawings, in Figure 1, the reference character 7 designates the pan and 8 represents generally the holder. The holder comprises a split metal band or ring having a reduced tongue 9 at one end for slip joint connection with a retaining or keeper loop 10 on the companion end. This permits the ends to be slidably and overlappedly connected to facilitate adjustment of the circumference of the holder.

As seen in Figure 2, it will be observed that the strap-like keeper loop 10 is struck out from the supporting legs 11. There are other supporting legs 12 which rest on the bottom of the pan and hold the rings in the desired elevated position so that they may be placed concentrically within the pan in a position to raise above the bottom thereof.

The numeral 13 designates a slidable retaining clip in the nature of a slip of metal bent upon itself so as to form a V-shaped wedge portion 14 which can be jammed between the keeper loops 10 and the adjacent terminal of the end 9. This allows the adjustment of the ring or band to be maintained after it has been previously adjusted.

The numerals 15 represent lifting lugs to aid in lifting the complete device out of the pan at the desired time. The numeral 16 designates an outwardly struck ear which projects into the annulus face between the rim of the pan and the holder 8 as seen in Figure 1. This provides a support for the first cooky placed in position. In other words, this ear 16 holds the cooky upright and prevents it from falling down into the pan and allows the remaining cookies to be stacked or racked into the annulus face between the device and the rim of the pan.

As an incidental feature, I call attention to the top bead 17 formed around the upper edge of the ring and including a reinforcing wire. Assuming that the device is in the pan as shown in Figure 1, it is obvious that the annulus face between the device 8 and the rim of the pan is regulated according to the size of the wafers, cakes or cookies to be employed in preparing the product for subsequently conditioning.

The attendant places the cookies between the pan and the holder, placing the first cookies against the flap or ear 16 to keep it in place. Then a portion of the batter is poured into the pan putting in enough so that it comes substantially level with the lower edge of the ring.

Then the device 8 is lifted out through the medium of the lifting fingers 15 and the remainder of the batter is put into the pan.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. As a new product of manufacture, a cooky holder comprising an adjustable ring-like band provided with an outstanding cooky supporting ear at a predetermined point, a plurality of supporting legs carried by said pan and adapted to rest against the bottom of the pan, and lifting fingers carried by and projecting into the interior of the band to permit it to be conveniently lifted out of the pan.

2. As a new product of manufacture, a cooky holder of the class described comprising a ring-like band having a keeper at one end, and having the opposite end fashioned for adjustable connection with said keeper, a slidable retaining clip associated with the keeper for holding the ends of the band in adjusted relationship, a plurality of supporting legs carried by and depending from the lower edge of said band.

3. As a new product of manufacture, a cooky holder of the class described comprising a ring-like band having a keeper at one end, and having the opposite end fashioned for adjustable connection with said keeper, a slidable retaining clip associated with the keeper for holding the ends of the band in adjusted relationship, a plurality of supporting legs carried by and depending from the lower edge of said band, said band being provided with an outstanding horizontally disposed cooky holding ear and further provided with a pair of diametrically opposite inwardly projecting lifting fingers.

In testimony whereof I affix my signature.

OTTO E. LUCHT.